United States Patent
Haws et al.

(10) Patent No.: US 9,152,379 B2
(45) Date of Patent: *Oct. 6, 2015

(54) EFFICIENT SORTING OF LARGE DIMENSIONAL DATA

(71) Applicant: International Business Machines Corporation, Armonk, NY (US)

(72) Inventors: David Haws, New York, NY (US); Laxmi P. Parida, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/049,805

(22) Filed: Oct. 9, 2013

(65) Prior Publication Data

US 2014/0164395 A1 Jun. 12, 2014

Related U.S. Application Data

(63) Continuation of application No. 13/711,227, filed on Dec. 11, 2012.

(51) Int. Cl.
G06F 17/30 (2006.01)
G06F 7/08 (2006.01)

(52) U.S. Cl.
CPC .................................. G06F 7/08 (2013.01)

(58) Field of Classification Search
CPC ........................................................ G06F 7/24
USPC ................................................. 707/752, 748
See application file for complete search history.

(56) References Cited

U.S. PATENT DOCUMENTS

| 6,058,405 | A * | 5/2000 | Kolte et al. ................. 708/304 |
| 6,629,097 | B1 | 9/2003 | Keith |
| 6,754,684 | B1 | 6/2004 | Kotlov |
| 7,162,684 | B2 | 1/2007 | Hocevar |
| 7,801,385 | B2 | 9/2010 | Chiu |
| 7,912,311 | B2 | 3/2011 | Pearson |
| 7,991,755 | B2 | 8/2011 | Chitrapura et al. |
| 8,725,724 | B2 * | 5/2014 | Gelbard et al. ............... 707/723 |

(Continued)

OTHER PUBLICATIONS

Moore, A., et al., "Cached Sufficient Statistics for Efficient Machine Learning with Large Datasets," Journal of Artificial Intelligence Research, vol. 8, pp. 67-91, 1997.

(Continued)

*Primary Examiner* — Mariela Reyes
*Assistant Examiner* — Thong Vu
(74) *Attorney, Agent, or Firm* — Fleit Gibbons Gutman Bongini & Bianco PL; Thomas Grzesik

(57) ABSTRACT

Various embodiments sort data. In one embodiment, a matrix D including a set of data values is received. A matrix Q is received, and includes a set of columns and a set of rows. The matrix Q further includes a sorting of each column of the matrix D. Each of these rows corresponds to a sorting. Each of a set of values in each of the set of columns in the matrix Q identifies a row in the matrix D. At least one sub-matrix D' of the matrix D is identified. A set of columns of the sub-matrix D' is restricted to one or more columns of the matrix D. A processor sorts the sub-matrix D' by rows based on the sorting of the set of columns of the matrix D as given in the matrix Q, and based on the set of data values in the matrix D.

14 Claims, 7 Drawing Sheets

(56) References Cited

U.S. PATENT DOCUMENTS

2009/0031186 A1 1/2009 Matsumoto et al.
2013/0036085 A1 2/2013 Wunderling

OTHER PUBLICATIONS

Non-Final Office Action dated Jul. 28, 2014 received for U.S. Appl. No. 13/711,227.

* cited by examiner

FIG. 2

$D =$ (matrix 200, rows labeled 0–9, columns labeled 0,1,2,3,4)

FIG. 3

$D' =$ (matrix 300)

FIG. 4

$D'' =$ (matrix 400)

FIG. 5

$D''' =$ (matrix 500)

FIG. 6

$Q =$ (matrix 600)

Require: $D \in \mathbb{R}^{m \times n}, Q \in \mathbb{Z}^{m \times n}, \{a_1, ..., a_p\} \subseteq \{0, ..., n-1\}$.
Ensure: $L' \in \mathbb{Z}^m$.
1: $L := 0 \in \mathbb{R}^n$.
2: for all $i \in \{a_1, ..., a_p\}$ do
3:    $(L) := quickLexSortRefine(D, Q, i, L)$.
4: end for
5: return $L$.

FIG. 7

Require: $D \in \mathbb{R}^{m \times n}, Q \in \mathbb{Z}^{m \times n}, i \in \{0, ..., n-1\}, L \in \mathbb{Z}^m$.
Ensure: $L' \in \mathbb{Z}^m$ 1: $L' := 0 \in \mathbb{Z}^m$.
2: $IDval := 0 \in \mathbb{Z}^m$. # Records most recent value in $D$ w.r.t. ID.
3: $IDvalInit := 0 \in \mathbb{Z}^m$.
4: $subID := 0 \in \mathbb{Z}^m$. # Records subID of $L$.
5: $newCount := 0 \in \mathbb{Z}^m$. # Records count of refinements of each input ID of $L$.
6: for $j = 0, ..., m-1$ do
7:   if $IDvalInit[L[Q[j,i]]] == 0$ then
8:     $IDvalInit[L[Q[j,i]]] := 1$
9:     $IDval[L[Q[j,i]]] := D[Q[j,i],i]$.
10:   else
11:     if $IDval[L[Q[j,i]]] \; != D[Q[j,i],i]$ then
12:       $IDval[L[Q[j,i]]] := D[Q[j,i],i]$.
13:       $newCount[L[Q[j,i]]] := newCount[L[Q[l,i]]] + 1$.
14:     end if
15:   end if
16:   $subID[Q[j,i]]] := newCount[L[Q[,j,i]]]$.
17: end for
18: $curOffset := 0$.
19: for $j = 0, ..., m-1$ do
20:   $temp := newCount[j]$.
21:   $newCount[j] := curOffset$.
22:   $curOffset := curOffset + temp$.
23: end for
24: for $j = 0, ..., m-1$ do
25:   $L'[j] := L[j] + newCount[L[j]] + subID[j]$.
26: end for
27: return ($L'$).

FIG. 8

Require: $D \in \mathbb{R}^{m \times n}, Q \in \mathbb{Z}^{m \times n}, B \subseteq \{0,\ldots,m-1\} L \in \mathbb{R}^m$.
1: for $i = max(B) + 1 \text{ to } n - 1$ do
2:     $B' := B \cup \{i\}$.
3:     $L' :=$ quickLexSortRefine $(D, Q, i, L)$.
4:     Print $L'$
5:     quickLexSortAllSubMat $(D, Q, B', L')$
6: end for

FIG. 9

$$D' := \begin{pmatrix} 2 & 4 & 0 & 2 & 1 & 3 \\ 8 & 0 & 0 & 0 & 0 & 3 \\ 1 & 0 & 1 & 1 & 0 & 1 \\ 3 & 0 & 1 & 1 & 1 & 2 \\ 6 & 0 & 1 & 1 & 1 & 3 \\ 7 & 1 & 1 & 0 & 1 & 2 \\ 4 & 1 & 1 & 1 & 0 & 1 \\ 5 & 1 & 1 & 1 & 1 & 1 \\ 9 & 1 & 1 & 1 & 1 & 1 \\ 0 & 1 & 1 & 1 & 1 & 2 \end{pmatrix}$$

FIG. 10

$$D'' := \begin{pmatrix} 8 & 3 & 1 & 0 & 2 & 4 \\ 4 & 1 & 0 & 1 & 1 & 0 \\ 5 & 1 & 1 & 1 & 1 & 1 \\ 9 & 1 & 1 & 1 & 1 & 1 \\ 7 & 2 & 1 & 1 & 0 & 1 \\ 1 & 2 & 1 & 1 & 1 & 0 \\ 3 & 2 & 1 & 1 & 1 & 1 \\ 0 & 2 & 1 & 1 & 1 & 2 \\ 2 & 3 & 0 & 0 & 0 & 0 \\ 0 & 3 & 1 & 1 & 1 & 0 \end{pmatrix}$$

FIG. 11

Require: $D \in \mathbb{R}^{m \times n}$, $Q \in \mathbb{Z}^{m \times n}$, ordered subset $B \subseteq \{0, \ldots, m-1\}$ $L \in \mathbb{R}^m$.

1: for $i \in 0, \ldots, n-1$ do
2:     $B' := \{B, i\}$, as an ordered subset.
3:     $L' := $ quickLexSortRefine $(D, Q, i, L)$.
4:     Print $L'$
5:     quickLexSortAllPerms $(D, Q, B', L')$
6: end for

FIG. 12

EFFICIENT SORTING OF LARGE DIMENSIONAL DATA

CROSS-REFERENCE TO RELATED APPLICATIONS

This application is based upon and claims priority from prior U.S. patent application Ser. No. 13/711,227, filed on Dec. 11, 2012, now U.S. Pat. No. 9,020,958, the entire disclosure of which is herein incorporated by reference in its entirety.

BACKGROUND

The present invention generally relates to the field of data sorting, and more particularly relates to efficiently sorting large dimensional data.

Lexicographical sorting of databases (including restricted databases) is a fundamental problem with many applications. One important application is to quickly counting occurrences of a specific query in a large database consisting of m records and n attributes. That is, if the database, or restricted database, is lexicographically sorted then the occurrences of specific entries can be quickly tallied. For example, suppose a database holds the weather (rain or no-rain), traffic (light or heavy), and air quality (good or bad) for every day of the year for a given city. An example query is to count the number of days it was raining and where the air quality was bad. If the database was not sorted, a naive approach would be to examine each entry of the database (restricted to weather and air quality) and count the occurrences of the query (rain and bad). Typically, the database is repeatedly queried and this naive approach is not sufficient, especially where the database is queried over a subset of the total features, i.e. a restriction of the database.

BRIEF SUMMARY

In one embodiment, a computer implemented method for sorting data is disclosed. The method includes receiving a matrix D including a set of data values is received. The matrix D includes a set of rows and a set of columns. A matrix Q is received, and includes a set of columns and a set of rows. The matrix Q further includes a sorting of each column of the matrix D, where each of the set of rows in the matrix Q corresponds to a sorting, and each of a set of values in each of the set of columns in the matrix Q identifies a row in the matrix D. At least one sub-matrix D' of the matrix D is identified. The at least one sub-matrix D' includes a set of rows and a set of columns. The set of columns of the sub-matrix D' is restricted to one or more columns of the matrix D. A processor sorts the at least one sub-matrix D' by rows based on the sorting of the set of columns of the matrix D as given in the matrix Q, and based on the set of data values in the matrix D.

In another embodiment, an information processing system for sorting data is disclosed. The information processing system includes a memory and a processor that is communicatively coupled to the memory. A sorting module is communicatively coupled to the memory and the processor. The sorting module is configured to perform a method. The method includes receiving a matrix D including a set of data values is received. The matrix D includes a set of rows and a set of columns. A matrix Q is received, and includes a set of columns and a set of rows. The matrix Q further includes a sorting of each column of the matrix D, where each of the set of rows in the matrix Q corresponds to a sorting, and each of a set of values in each of the set of columns in the matrix Q identifies a row in the matrix D. At least one sub-matrix D' of the matrix D is identified. The at least one sub-matrix D' includes a set of rows and a set of columns. The set of columns of the sub-matrix D' is restricted to one or more columns of the matrix D. A processor sorts the at least one sub-matrix D' by rows based on the sorting of the set of columns of the matrix D as given in the matrix Q, and based on the set of data values in the matrix D.

In a further embodiment, a non-transitory computer program product for sorting data is disclosed. The computer program product includes a storage medium readable by a processing circuit and storing instructions for execution by the processing circuit for performing a method. The method includes receiving a matrix D including a set of data values is received. The matrix D includes a set of rows and a set of columns. A matrix Q is received, and includes a set of columns and a set of rows. The matrix Q further includes a sorting of each column of the matrix D, where each of the set of rows in the matrix Q corresponds to a sorting, and each of a set of values in each of the set of columns in the matrix Q identifies a row in the matrix D. At least one sub-matrix D' of the matrix D is identified. The at least one sub-matrix D' includes a set of rows and a set of columns. The set of columns of the sub-matrix D' is restricted to one or more columns of the matrix D. A processor sorts the at least one sub-matrix D' by rows based on the sorting of the set of columns of the matrix D as given in the matrix Q, and based on the set of data values in the matrix D.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates a first example an input matrix that includes a set of data values according to one embodiment of the present invention;

FIG. 3 illustrates a first example of a sub-matrix of the input matrix in FIG. 2 according to one embodiment of the present invention;

FIG. 4 illustrates a second example of a sub-matrix of the input matrix in FIG. 2 according to one embodiment of the present invention;

FIG. 5 illustrates a third example of a sub-matrix of the input matrix in FIG. 2 according to one embodiment of the present invention;

FIG. 6 illustrates one example of a matrix comprising sorting information for each column of the input matrix in FIG. 2 according to one embodiment of the present invention;

FIG. 7 illustrates one example of pseudocode for sorting a sub-matrix of a matrix according to one embodiment of the present invention;

FIG. 8 illustrates one example of pseudocode for refining a sorting of one or more sub-matrices a matrix according to one embodiment of the present invention;

FIG. 9 illustrates one example of pseudocode for sorting multiple sub-matrices a matrix according to one embodiment of the present invention;

FIG. 10 shows a first example of a lexicographical sorting of the input matrix in FIG. 2 according to one embodiment of the present invention;

FIG. 11 shows a second example of a lexicographical sorting of the input matrix in FIG. 2 according to one embodiment of the present invention;

FIG. 12 illustrates one example of pseudocode for sorting all sub-matrices of a matrix over all permutations of columns according to one embodiment of the present invention.

DETAILED DESCRIPTION

Figure 1:
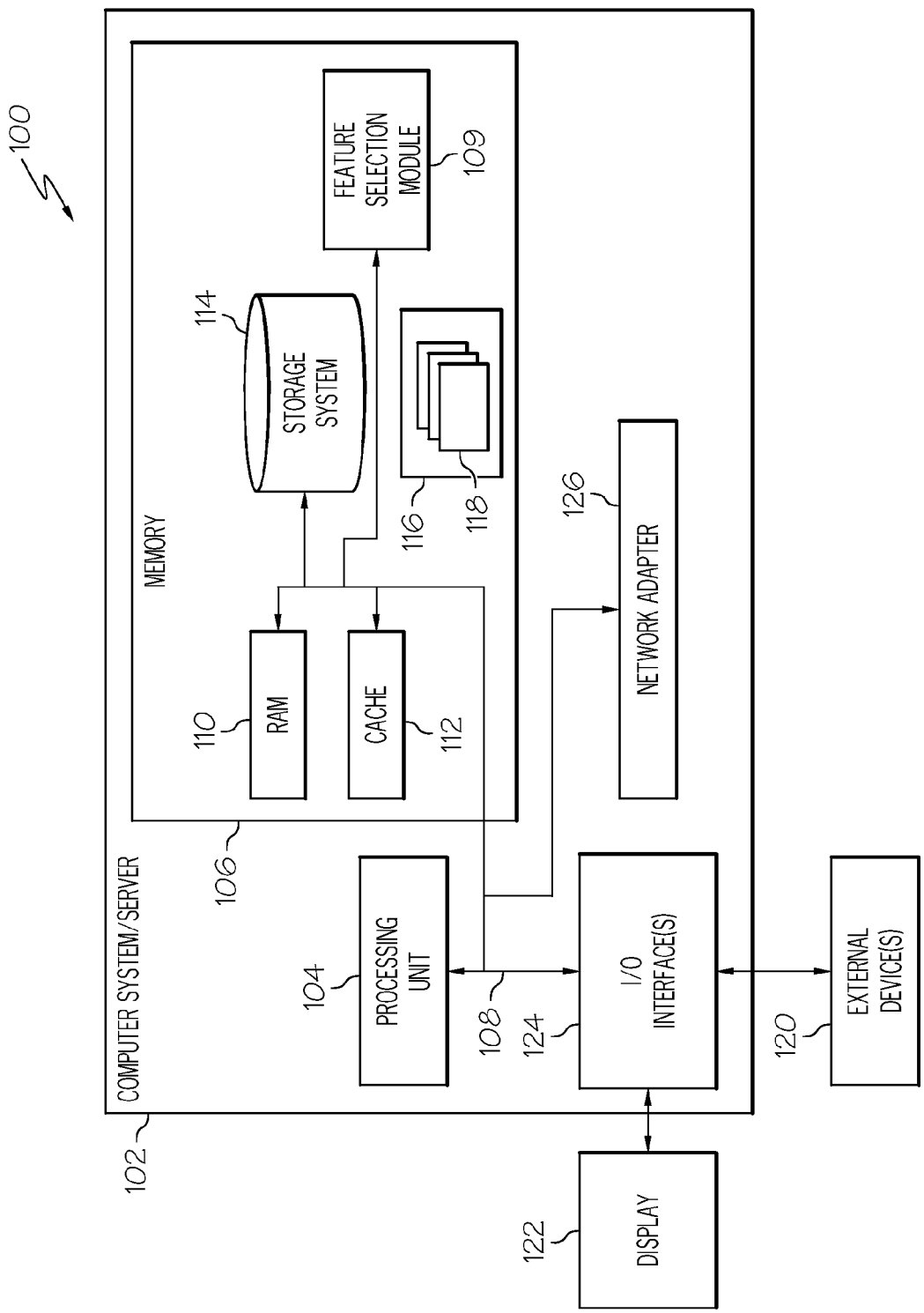
FIG. 1 is a block diagram illustrating one example of an operating environment according to one embodiment of the present invention.

FIG. 1 illustrates a general overview of one operating environment 100 according to one embodiment of the present invention. In particular, FIG. 1 illustrates an information processing system 102 that can be utilized in embodiments of the present invention. The information processing system 102 shown in FIG. 1 is only one example of a suitable system and is not intended to limit the scope of use or functionality of embodiments of the present invention described above. The information processing system 102 of FIG. 1 is capable of implementing and/or performing any of the functionality set forth above. Any suitably configured processing system can be used as the information processing system 102 in embodiments of the present invention.

As illustrated in FIG. 1, the information processing system 102 is in the form of a general-purpose computing device. The components of the information processing system 102 can include, but are not limited to, one or more processors or processing units 104, a system memory 106, and a bus 108 that couples various system components including the system memory 106 to the processor 104.

The bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 106, in one embodiment, includes a sorting module 109 configured to perform one or more embodiments discussed below. For example, in one embodiment, the sorting module 109 is configured to perform one or more sorting operations on a database restricted to any set of attributes. The sorting module 109 quickly sorts all possible restrictions by attributes, while requiring minimal memory resources. The sorting module 109 is discussed in greater detail below. It should be noted that even though FIG. 1 shows the sorting module 109 residing in the main memory, the sorting module 109 can reside within the processor 104, be a separate hardware component, and/or be distributed across a plurality of information processing systems and/or processors.

The system memory 106 can also include computer system readable media in the form of volatile memory, such as random access memory (RAM) 110 and/or cache memory 112. The information processing system 102 can further include other removable/non-removable, volatile/non-volatile computer system storage media. By way of example only, a storage system 114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. The memory 106 can include at least one program product having a set of program modules that are configured to carry out the functions of an embodiment of the present invention.

Program/utility 116, having a set of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the present invention.

The information processing system 102 can also communicate with one or more external devices 120 such as a keyboard, a pointing device, a display 122, etc.; one or more devices that enable a user to interact with the information processing system 102; and/or any devices (e.g., network card, modem, etc.) that enable computer system/server 102 to communicate with one or more other computing devices. Such communication can occur via I/O interfaces 124. Still yet, the information processing system 102 can communicate with one or more networks such as a local area network (LAN), a general wide area network (WAN), and/or a public network (e.g., the Internet) via network adapter 126. As depicted, the network adapter 126 communicates with the other components of information processing system 102 via the bus 108. Other hardware and/or software components can also be used in conjunction with the information processing system 102. Examples include, but are not limited to: microcode, device drivers, redundant processing units, external disk drive arrays, RAID systems, tape drives, and data archival storage systems.

In one embodiment, the following framework is utilized by the sorting module 109. Let $D \in R^{m \times n}$ be a real matrix where rows and columns are indexed by $\{0, \ldots, m-1\}$ and $\{0, \ldots, n-1\}$, respectively. $v \in R^n$ Is less than $w \in R^n$ lexicographically, denoted $v <_{lex} w$, if $v_0 = w_0, \ldots, v_k = w_k$ and $v_{k+1} < w_{k+1}$ for some $0 \leq k < n-1$. For example, $[2,1,3,0] <_{lex} [2,1,5,-1]$. If $n=1$, lexicographical order is equivalent to the normal ordering. Therefore, the task, in one embodiment, of the sorting module 109 is to sort the rows of sub-matrices of D using lexicographical ordering.

Figures 2, 3, 4, 5, 6:
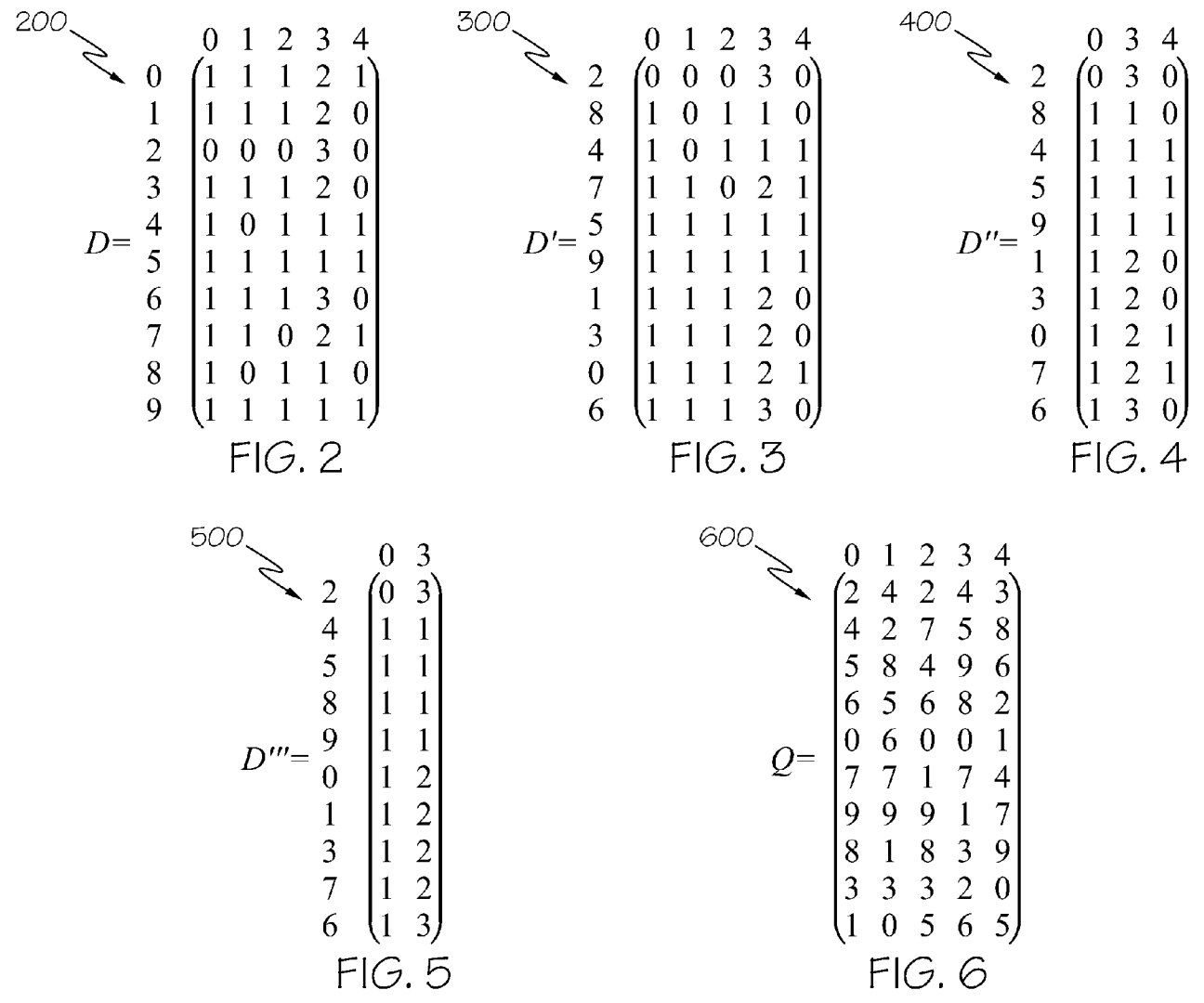

Let $D' \in R^{m \times l}$ be a sub-matrix of $D \in R^{m \times n}$. A sorting of the rows of D' is specified in a ranking vector $L \in R^m$, where $L_i < L_j$ implies that row i comes before row j in D' in lexicographic order. Stated differently, each row is assigned a rank of 0 to n−1, where ties are allowed. This also allows for $L_i = L_j$, implying row i and j of D' are equal. For example, FIG. 2 shows one example of an input matrix D 200, with rows m indexed $\{0, \ldots, 9\}$ and columns n indexed $\{0, \ldots, 4\}$. FIG. 3 shows a matrix D' 300 that gives the rows of matrix D 200 sorted lexicographically after a sorting operation performed by the sorting module 109, where the ranking vector of D' is $L':=[6, 5,0,5,2,4,7,3,1,4]^T$. FIG. 4 shows a matrix D" 400 that gives the rows of D sorted lexicographically restricted to columns $\{0, 3, 4\}$ after a sorting operation performed by the sorting module 109, where the ranking vector of D" is $L":=[4,3,0,3, 2,2,5,4,1,2]^T$. FIG. 5 shows a matrix D''' 500 that gives the rows of D sorted lexicographically restricted to columns {0, 3} after a sorting operation performed by the sorting module 109, where the ranking vector of D''' is L''':=[2,2,0, 2,1,1,3,2,1,1]$^T$. It should be noted that the sorting module 109 can also compute the counts of occurrences of each unique row of the sorted matrices in time linear in the number of rows.

In one embodiment, the sorting module 109 sorts a sub-matrix (by rows) of an input matrix D restricted to a set of columns (attributes) of D utilizing an initial sorting of the columns of D. In this embodiment, each column of D is independently sorted. The results of this initial sorting of columns in D is stored in a matrix $Q \in Z_+^{m \times n}$ where the j th column $Q_j$ of Q stores the row indices $\{0, \ldots, m\}$ after sorting the j th column $D_i$ of D. That is, $Q_j$ is one-line Cauchy notation of the permutation of the row indices which sort the column vector $D_j$. FIG. 6 shows one example of a matrix Q 600 for the matrix D shown in FIG. 2.

FIG. 7 shows one example of pseudocode 700 for performing the above sorting of a sub-matrix of an input matrix D. In this embodiment, the sorting module 109 receives as input a matrix $D \in R^{m \times n}$, a matrix $Q \in Z^{m \times n}$, and $\{\alpha_p, \ldots, \alpha_p\} \subseteq \{0, \ldots, n-1\}$, which is a selection of columns to be sorted and their rows (i.e., a sub-matrix of D). It should be noted that the Q matrix can be provided by an external source such as a user, application, etc., or can be generated by the sorting module 109. The sorting module 109 ensures that $L' \in Z^m$. The sorting module 109, in this embodiment, sorts by iteratively increasing the number of attributes, until the desired set of attributes is reached. That is, the sorting module 109 preforms a sort refining operation to refine the current sort with respect to columns $\{a_1, \ldots, a_j\}$ to give a sort with respect to the columns $\{a_1, \ldots, a_{j+1}\}$. The sorting module 109 then outputs a ranking vector L', which comprises the sorting of the rows of matrix D with respect to the columns selected by the user. For example, FIG. 4 shows one example of a sub-matrix 400 sorted based on the above sorting operation with L'=[4,3,0,3,2,2,5,4,1,2]$^T$.

FIG. 8 shows one example of pseudocode 800 for the sort refining operation performed by the sorting module 109. When performing the sort refining operation the sorting module 109 takes as input the matrix D [D], the sorting of the columns of D [Q], the column (attribute) to refine L by [i], and the current sorting [L]. The sort refining operation returns the refined vector L'. That is, if the input L represents the sorting of the rows of D (restricted to some unknown columns), the returned value of L' represents the refined sorting where appending the ith column of D is considered. Again, if the input L represents the lexicographical sorting of $$D' = \begin{pmatrix} & j_0 & \cdots & j_p & \\ 0 & * & \cdots & * & \\ 1 & * & \cdots & * & \\ \vdots & \vdots & \ddots & \vdots & \\ n & * & \cdots & * & \end{pmatrix}$$

the output L' is the lexicographical sorting of $$D'' = \begin{pmatrix} & j_0 & \cdots & j_p & i \\ 0 & * & \cdots & * & D_{0i} \\ 1 & * & \cdots & * & D_{1i} \\ \vdots & \vdots & \ddots & \vdots & \vdots \\ n & * & \cdots & * & D_{ni} \end{pmatrix}.$$

In more detail, the sort refining operation performed by the sort module 109 takes as input a real m×n matrix D, an integral m×n matrix Q, an integer i between 0 and n−1, and a m length integer vector L (ranking vector). D is the original input matrix, Q is a matrix in which every column of Q gives the sorting of the corresponding column in D, i is the column of D to consider when refining the ranking vector L, and L is assumed to be a ranking vector of some sorting of the rows of D. The output of the sort refining operation is an integral vector L' (ranking vector). In one embodiment, L' is a refinement of the sort given by L, where the refinement is determined by the i th column of D. That is, if L is the ranking vector of a sort of some (unobserved) hypothetical sub-matrix D' of D, then L' is the ranking vector of the sorting of D' with the i th column of D appended to the right column. Here, the term "refinement" indicates that the i th column of D is used to break any ranking ties in the input ranking vector L.

Initially, the sorting module 109 initializes the ranking vector L' to be an m vector of all zeros. A first memory structure, IDval, is initialized to be an m vector of all zeros. The j th position of IDval records the most recently observed value in the i th column of D with rank j, where the rank is determined by ranking vector L. A second memory structure, IDvalInit, is also initialized to be an m vector of all zeros. The j th entry in IDvalInit is 0 if an entry of L of rank j has not yet been observed, otherwise it is 1. A third memory structure, subID, is also initialized to be an m vector of all zeros. The memory structure subID records the sub-ranking of each row of D. Initially all rows have the same sub-ranking. A fourth memory structure, newCount, is also initialized to be an m vector of all zeros. The j entry in newCount records the number of times ties of all rows of rank j (rank determined by L) are able to be broken when considering refining L using the i th column of D.

The sorting module 109 loops over all rows of D, i.e. let j vary from 0 to m−1. For example, consider a sub-matrix D''' comprising columns 0 and 3 of matrix D of FIG. 4. The sorting module 109 loops over all rows of D for each of the columns 0 and 3. Recall Q[j,i] is the row of the j th ordered entry of column i of D. Then L[Q[j,i]] is the ranking of the row Q[j,i], where L initially comprises all zeros. The sorting module 109 selects rows based on Q. Using Q of FIG. 6 as an example the sorting module 109 first selects row 2 of D since row 2 is in the 0$^{th}$ row of column 0 in Q. If IDvalInit[L[Q[j,i]]] is 0, that is if this is the first time the sorting module 109 has observed an item of ranking L[Q[j,i]], which is 0 in this example, then the sorting module 109 marks that it has observed an item of ranking L[Q[j,i]]. That is, the sorting module 109 sets IDvalInit[L[Q[j,i]]]=1.

The sorting module 109 records the value of row Q[j,i] and column i of D as the most recently observed item of rank L[Q[j,i]]. That is, the sorting module 109 sets IDval[L[Q[j,i]]]=D[Q[j,i],i]. In the current example, the sorting module 109 sets IDval[L[Q[j,i]]]=0 since the value of row 2 in D of FIG. 4 under column 0 is 0. Otherwise, if IDvalInit[L[Q[j,i]]] is 1, that is if this is not the first time the sorting module 109 has observed an item of ranking L[Q[j,i]] then the if the value of row Q[j,i] and column i of D does equal the most recently observed value of item with rank L[Q[j,i]] (IDval[L[Q[j,i]]]) then the sorting module 109 records the value of row Q[j,i] and column i of D as the most recently observed item of rank L[Q[j,i]]. That is, the sorting module 109 sets IDval[L[Q[j,i]]]=D[Q[j,i], i].

For rank L[Q[j,i]], the sorting module 109 increases (by one) the number of times the value of the most recently recorded item of rank L[Q[j,i]] changed. That is, the sorting module 109 sets newCount[L[Q[j,i]]]:=newCount[L[Q[j, i]]]+1. The sorting module 109 sets the sub-ranking of row Q[j,i] to be equal to the number of times the most recently recorded item of rank L[Q[j,i]] changed. That is, the sorting module 109 sets subID[Q[j,i]]=newCount[L[Q[j i]]]. The sorting module 109 also sets the current offset to be zero. That is, the sorting module 109 sets curOffset=0. The sorting module 109 loops over 0 to m−1, i.e. let j=0, . . . , m−1. The sorting module 109 sets a memory structure, temp, to be equal to the number of times the most recently recorded item of rank j changed. That is, the sorting module 109 sets temp=newCount[j]. The sorting module 109 sets newCount [j] equal to the curOffset, and increases curOffset by temp. Now the j position of newCount is the cumulative sum of all strictly previous values of newCount. The sorting module 109 loops over 0 to m−1, i.e. let j=0, . . . , m−1. The sorting module 109 sets L'[j] to be L[j] plus newCount[L[j] plus subID[j], and outputs L' to a user.

As can be seen from the above, the sort refining operation selects a row in D, where the row is selected based on Q, the value of the row under the current column (e.g., column 0) in D is used to determine the rank of the given row. However, if there is a tie between two or more rows a sub-ranking is assigned to the rows based on the value of the row under the ith column (e.g., column 3) of D is used to break the tie. If additional columns are not available to break a tie then tied rows can be assigned the same rank. The output of the sort refining operation is a refinement of L. For example, the output of the sort refining operation for the sub-matrix D''' of FIG. 5 is L''':=$[2,2,0,2,1,1,3,2,1,1]^T$ In addition to the performing a sort on a single sub-matrix of an input matrix D, the sorting module 109 can also perform multiple sorts of nested or related sub-matrices. In this embodiment, let $D \in R^{m \times n}$ be a real matrix. For every sub-matrix D' of D, D' is sorted in lexicographic order where the columns are taken in their natural order. For example, if D has columns {1,2,3,4}, the task is to sort all sub-matrices of D given by columns {1}, {2}, {3}, {4}, {1,2}, {1,3}, {1,4}, {2,3}, {2,4}, {3,4}, {1,2,3}, {1,2,4}, {1,3,4}, {2,3,4}, and {1,2,3,4}.

FIG. 9 shows one example of pseudocode 900 for performing multiple sorts of nested or related sub-matrices. In particular, the pseudocode 900 of FIG. 9 shows that the sorting module 109 receives as input a real m×n matrix D, an integral m×n matrix Q, a subset of integers B between 0 and m−1, and a m length integer vector L (ranking vector). The output of this sorting operation is an integral vector L' for each sub-matrix of D, where the columns are taken in their natural order. When performing this sorting operation the sorting module 109 explores all possible sub-matrices (while taken the columns in their natural order) using a depth-first-search approach and constantly refining the ranking vector that stores the current sort utilizing the sort refining operation discussed above with respect to FIG. 8. It should be noted that the integral vector L' determined for a sub-matrix is used as an input for a subsequent related sub-matrix, thereby saving computational resources and time. For example, if matrix D has columns {1,2,3,4} where the natural order of the columns is {1,2} and {1,3}, the integral vector L' determined for sub-matrix {1,2} is used as an input for the sort refining operation of FIG. 8 to determine the integral vector for sub-matrix {1, 3}.

It should be noted that a lexicographical sort depends on the order of the columns. That is, the order of the rows of D sorted lexicographically may be different than the order of the rows of D' sorted lexicographically where D' is the same as D, but with a different permutation of the columns. For example, consider the matrix D of FIG. 2. FIGS. 10-11 show examples of lexicographical sortings 1000, 1100 of D, where the columns have been permuted. This gives different orderings of the rows of D.

Therefore, the sorting module 109, in one embodiment, also sorts all sub-matrices of D over all permutations of columns. For example, let $D \in R^{m \times n}$ be a real matrix. For every sub-matrix D' of D, the sorting module 109 sorts D' in lexicographic order where the order of the columns of D' are used. It is not sufficient to simply use the terminology "set" when the order matters. When the order of a set matters the terminology "ordered set" is used. Thus, {1,2,3} is a different ordered set than {2,3,1}, but they are equal as sets.

FIG. 12 shows one example of pseudocode 1200 for sorting of all sub-matrices of D over all permutations of columns. In particular, the pseudocode 1200 of FIG. 12 shows that the sorting module 109 receives as input a real m×n matrix D, an integral m×n matrix Q, a subset of integers B between 0 and m−1, and a m length integer vector L (ranking vector). The output of this sorting operation is an integral vector L' for each sub-matrix of D, where column order matters. When performing this sorting operation the sorting module 109 explores all possible sub-matrices (column order dependent) using a depth-first-search approach and constantly refining the L vector, which stores the current sort, utilizing the sort refining operation discussed above with respect to FIG. 8. It should be noted that the integral vector L' determined for a sub-matrix is used as an input for a subsequent related sub-matrix, thereby saving computational resources and time.

The sorting operations discussed above outperform basic comparison sorting operations. For example, consider the task of sorting D restricted to all possible choices of attributes. For $D \in R^{m \times n}$, there are $2^n$ choices of attributes. A basic comparison-sort sorting algorithm would require at least O(mlog (m)$2^n$) time. The sorting operations performed by the sorting module 109 only requires O(mlog(m)+m$2^n$), a reduction by a log factor of m. This is due to the fact that the sorting module 109 can be used to save many computations by exploring all choices of attributes in increasing cardinality. Moreover, the space requirement is only linear O(m).

Some conventional sorting operations require the computation of contingency tables. However, the time and space requirements to compute the required data structures for contingency tables can be enormous. For example, consider the ADtree method for computing contingency tables, assuming binary attributes (attributes only take two values), the cost to build an ADtree is bounded above by $$\sum_{k=0}^{\lfloor \log_2(m) \rfloor} \frac{m}{2^k} n_k,$$

where $D \in R^{m \times n}$. If all possible combinations of the binary attributes appear in D, the space requirement would be $2^n$. Even with a reasonable number of rows the space requirement would be bound above by $$\sum_{k=0}^{\lfloor \log_2(m) \rfloor} n_k.$$

The time and space requirements can become practically prohibitive as n and m grow. For example, constructing and storing the ADtree for a dataset $D \in R^{1000 \times 50000}$ would be infeasible. By contrast, the sorting operations performed by the sorting module 109 only require linear space and time for each sort.

One or embodiments discussed above can be used to efficiently and accurately sort data for a wide variety of applications. For example, Bayesian networks are graphical models that have applications in a many areas including machine learning, statistical inference, finance, biology, artificial intelligence, etc. At the core, learning a Bayesian network requires taking the input $D \in R^{m \times n}$ and computing contingency tables of D restricted to subsets of columns. In some situations, one may have to compute contingency tables for all possible subsets of columns of D. If m and n become large, it may be prohibitive to compute and store elaborate data structures. However, the sorting mechanism of one or more embodiments discussed above can quickly sort these subsets of columns while utilizing minimal memory resources.

For example, Bayesian networks can model epistasis, the interaction of multiple genes to produce a phenotype. Consider the genotypes for 1,000 individuals with 50,000 single nucleotide polymorphisms (SNPs) and some phenotype (disease/no-disease). Then $D \in R^{1000 \times 50001}$. The task of detecting k-way epistasis using Bayesian networks reduces to computing contingency tables (sorting) all possible choices of k subsets columns of D. Considering the ADtree equations discussed above, using ADtrees is not feasible. However, the sorting mechanism of one or more embodiments discussed above requires linear time and space, to check each choice of k columns of D.

Figure 13:
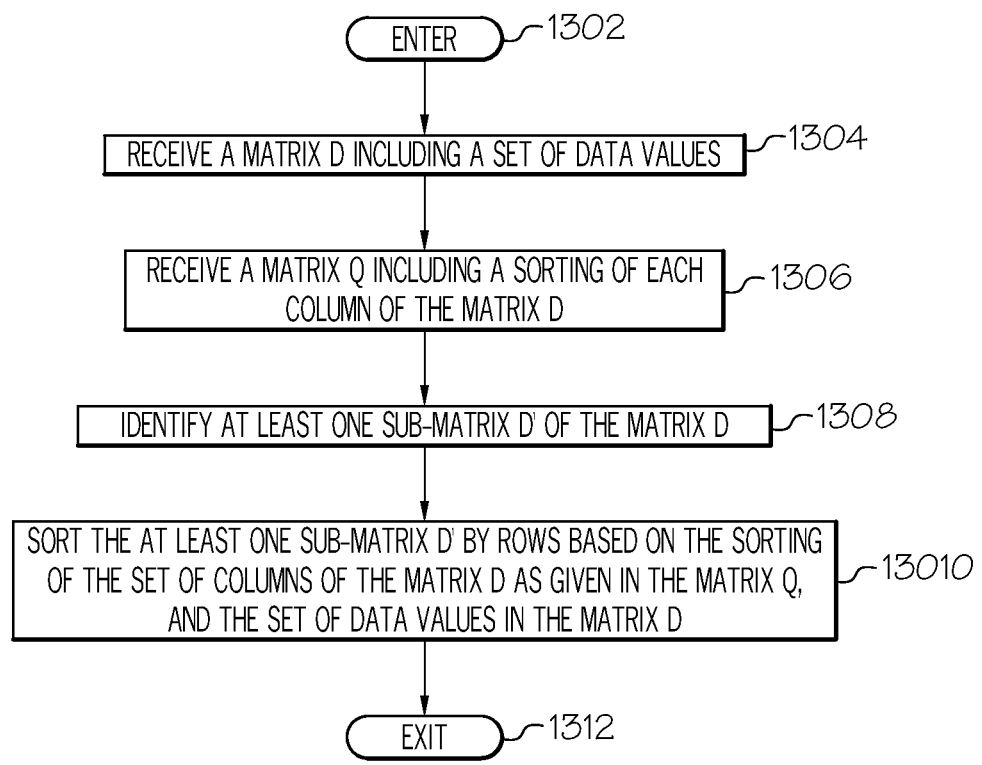
FIG. 13 is an operational flow diagram illustrating one example of a process for sorting data according to one embodiment of the present invention.

FIG. 13 is an operational flow diagram illustrating one example of efficiently sorting large dimensional data. The operational flow diagram begins at step 1302 and flows directly to step 1304. The sorting module 109, at step 1304, receives receiving a matrix D that includes a set of data values. The matrix D comprises a set of rows and a set of columns. The sorting module 109, at step 1306, receives a matrix Q that includes a set of columns and a set of rows. The matrix Q further includes a sorting of each column of the matrix D. Each the set of rows in the matrix Q corresponds to a sorting rank, and each of a set of values in each of the set of columns in the matrix Q identifies a row in the matrix D.

The sorting module 109, at step 1308, identifies at least one sub-matrix D' of the matrix D. The at least one sub-matrix D' includes a set of rows and a set of columns. The set of columns in the sub-matrix D' is restricted to one or more columns in the matrix D. The sorting module 109, at step 1310, sorts the at least one sub-matrix D' by rows based on the sorting of the set of columns of the matrix D as given in the matrix Q, and the set of data values in the matrix D. The control flow then exits at step 1312.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information processing system for sorting data, the information processing system comprising:
    a memory;
    a processor communicatively coupled to the memory; and
    a sorting module communicatively coupled to the memory and the processor, wherein the sorting module is configured to perform a method comprising:
        receiving a matrix D comprising a set of data values, wherein the matrix D comprises a set of rows and a set of columns;
        receiving a matrix Q comprising a set of columns and a set of rows, wherein each of a set of values in each of the set of columns identifies a row in the matrix D, and wherein an order of the set of values in each of the set of columns corresponds to a sorting of the set of data values in a respective column in the set of columns of matrix D;
        identifying at least one sub-matrix D' of the matrix D, wherein the at least one sub-matrix D' comprises a set of rows and a set of columns, where the set of columns is restricted to one or more columns of the matrix D; and
        sorting, by a processor, the at least one sub-matrix D' by rows, wherein the set of rows in sub-matrix D' are sorted in their entireties with respect to each other, and wherein the sorting is further based on the order of the set of values in each of the set of columns as given in the matrix Q, and the set of data values in the matrix D.

2. The information processing system of claim 1, wherein the sorting comprises:
    generating a f L comprising a sorting of each row of the sub-matrix D', where $L_i<L_j$ indicates that row i comes before row j in the at least one sub-matrix D' in lexicographic order, and where $L_i=L_j$ indicates row i and row j of the at least one sub-matrix D' are equal.

3. The information processing system of claim 2, wherein the method further comprises:
    identifying at least one additional sub-matrix D" of the matrix D, wherein the at least one additional sub-matrix D" comprises a set of rows and a set of columns, where the set of columns is restricted to one or more columns of the matrix D; and
    sorting the at least one additional sub-matrix D" by rows based on the sorting of the set of columns of the matrix D as given in the matrix Q, and the ranking vector L generated for the sub-matrix D'.

4. The information processing system of claim 3, wherein the at least one sub-matrix D' and the at least one additional sub-matrix D" are each restricted to one or more columns in the matrix D taken in their natural order in the matrix D.

5. The information processing system of claim 3, wherein an order of the set of columns in each of the at least one sub-matrix D' and collectively correspond to all possible permutations of columns in the matrix D.

6. The information processing system of claim 1, wherein the sorting comprises:
    selecting a column in the matrix Q corresponding to a first column of the sub-matrix D';
    selecting, in order, each row in the selected column;
    identifying, for each selected row, a row in the matrix D based on the value in the selected column corresponding to the selected row;
    identifying, for each identified row in the matrix D, a data value in a column in the matrix D corresponding to the selected column at the identified row; and
    determining, for each row in the sub-matrix D', a sorting rank based on the identified data values in the column of matrix D.

7. The information processing system of claim 6, wherein the determining further comprises:
    determining that at least two of the rows in the sub-matrix D' are associated with an identical data value;
    selecting, based on the determining, at least one additional column in the matrix Q corresponding to at least a second column of the sub-matrix D';
    selecting, in order, each row in the at least one additional column;
    identifying, for each selected row, a row in the matrix D based on the value in the at least one additional column corresponding to the selected row;
    identifying, for each identified row in the matrix D, a data value in at least one additional column in the matrix D corresponding to the at least one additional column in the matrix Q at the identified row; and
    determining, for each row in the sub-matrix D', the sorting rank based on the identified data values in the at least one additional column of matrix D.

8. A non-transitory computer program product for sorting data, the computer program product comprising:
    a storage medium readable by a processing circuit and storing instructions for execution by the processing circuit for performing a method comprising:
        receiving a matrix D comprising a set of data values, wherein the matrix D comprises a set of rows and a set of columns;
        receiving a matrix Q comprising a set of columns and a set of rows, wherein each of a set of values in each of the set of columns identifies a row in the matrix D, and wherein an order of the set of values in each of the set of columns corresponds to a sorting of the set of data values in a respective column in the set of columns of matrix D;

identifying at least one sub-matrix D' of the matrix D, wherein the at least one sub-matrix D' comprises a set of rows and a set of columns, where the set of columns is restricted to one or more columns of the matrix D; and sorting, by a processor, the at least one sub-matrix D' by rows, wherein the set of rows in sub-matrix D' are sorted in their entireties with respect to each other, and wherein the sorting is further based on the order of the set of values in each of the set of columns as given in the matrix Q, and the set of data values in the matrix D.

9. The non-transitory computer program product of claim 8, wherein the sorting comprises:

generating a ranking vector L comprising a sorting of each row of the sub-matrix D', where $L_i < L_j$ indicates that row i comes before row j in the at least one sub-matrix D' in lexicographic order, and where $L_i = L_j$, indicates row i and row j of the at least one sub-matrix D' are equal.

10. The non-transitory computer program product of claim 9, wherein the method further comprises:

identifying at least one additional sub-matrix D" of the matrix D, wherein the at least one additional sub-matrix D" comprises a set of rows and a set of columns, where the set of columns is restricted to one or more columns of the matrix D; and sorting the at least one additional sub-matrix D" by rows based on the sorting of the set of columns of the matrix D as given in the matrix Q, and the ranking vector L generated for the sub-matrix D'.

11. The non-transitory computer program product of claim 10, wherein the at least one sub-matrix D' and the at least one additional sub-matrix D" are each restricted to one or more columns in the matrix D taken in their natural order in the matrix D.

12. The non-transitory computer program product of claim 10, wherein an order of the set of columns in each of the at least one sub-matrix D' and collectively correspond to all possible permutations of columns in the matrix D.

13. The non-transitory computer program product of claim 8, wherein the sorting comprises:

selecting a column in the matrix Q corresponding to a first column of the sub-matrix D';

selecting, in order, each row in the selected column;

identifying, for each selected row, a row in the matrix D based on the value in the selected column corresponding to the selected row;

identifying, for each identified row in the matrix D, a data value in a column in the matrix D corresponding to the selected column at the identified row; and determining, for each row in the sub-matrix D', a sorting rank based on the identified data values in the column of matrix D.

14. The non-transitory computer program product of claim 13, wherein the determining further comprises:

determining that at least two of the rows in the sub-matrix D' are associated with an identical data value;

selecting, based on the determining, at least one additional column in the matrix Q corresponding to at least a second column of the sub-matrix D';

selecting, in order, each row in the at least one additional column;

identifying, for each selected row, a row in the matrix D based on the value in the at least one additional column corresponding to the selected row;

identifying, for each identified row in the matrix D, a data value in at least one additional column in the matrix D corresponding to the at least one additional column in the matrix Q at the identified row; and determining, for each row in the sub-matrix D', the sorting rank based on the identified data values in the at least one additional column of matrix D.

* * * * *